United States Patent
Kohs et al.

(10) Patent No.: US 7,721,977 B2
(45) Date of Patent: May 25, 2010

(54) VIBRATION REDUCTION PAD FOR HAND-HELD PAINT SPRAY GUNS

(75) Inventors: Stephen C. Kohs, Forest Lake, MN (US); Daniel J. Bruggeman, Minneapolis, MN (US)

(73) Assignee: Diversified Dynamics Corporation, Minneapolis, MN (US)

( * ) Notice: Subject to any disclaimer, the term of this patent is extended or adjusted under 35 U.S.C. 154(b) by 1134 days.

(21) Appl. No.: 10/411,003

(22) Filed: Apr. 9, 2003

(65) Prior Publication Data
US 2004/0217205 A1 Nov. 4, 2004

(51) Int. Cl.
*B05B 7/02* (2006.01)
(52) U.S. Cl. .......................... 239/525; 239/526; 239/530
(58) Field of Classification Search .................. 239/525, 239/526, 530
See application file for complete search history.

(56) References Cited

U.S. PATENT DOCUMENTS

| | | | |
|---|---|---|---|
| 4,598,871 A * | 7/1986 | Hartle | 239/706 |
| 5,236,129 A | 8/1993 | Grime et al. | |
| 5,330,108 A | 7/1994 | Grime et al. | |
| 5,330,249 A * | 7/1994 | Weber et al. | 297/214 |
| 5,348,360 A * | 9/1994 | Mencarelli et al. | 294/57 |
| 5,395,046 A * | 3/1995 | Knobbe et al. | 239/3 |
| 5,491,898 A * | 2/1996 | Riley | 30/366 |
| 5,803,367 A | 9/1998 | Heard et al. | |
| 6,622,937 B2 * | 9/2003 | Schroeder et al. | 239/113 |

FOREIGN PATENT DOCUMENTS

| EP | 0 572 236 A2 | 12/1993 |
|---|---|---|
| EP | 0 572 236 A3 | 12/1993 |
| EP | 0 572 236 B1 | 12/1993 |

\* cited by examiner

*Primary Examiner*—Hoang M Nguyen
(74) *Attorney, Agent, or Firm*—Gerald E. Helget; Nelson R. Capes; Briggs and Morgan, P.A.

(57) ABSTRACT

A pad for handle grips of hand held paint spray guns. Frequent prolonged use of paint spray guns can result in the fatiguing and stressing of operator hands. Fatigue and stress can be aggravated by requiring the operator to hold his or her hand in essentially one position on the handle grip. The pad reduces such fatigue and stress. The pad fits within a recessed region that is molded into the paint spray gun handle where the operator's palm meets the grip. Alternatively, the pad could be attached to existing paint spray gun handle grips that are lacking the recessed region. The pad is made of a material that is less dense than the synthetic resinous material of the spray gun handle grip. Preferably, the material is plastic foam or gel and is attached to the spray gun handle using an acrylic glue. The pad is designed to absorb some of the vibrational energy that is transmitted to the operator's hand in current spray gun handles. This reduction in vibrational energy transmission decreases operator fatigue and stress. The pad is deformable which provides the operator with added comfort by improving the fit between the operator's palm and the spray gun handle grip, thus reducing fatigue and stress. The material of the pad allows for a better grip by the operator on the spray gun handle. In addition, the material of the pad combined with its positioning against the operator's palm acts to distribute heat away from the hand of the operator. The pad is designed to accommodate different hand sizes and shapes without the need to remove and replace hand grip covers or sleeves. The deformability of the pad also allows the operator to modify his or her hand positions during operation which reduces operator fatigue and stress.

4 Claims, 2 Drawing Sheets

VIBRATION REDUCTION PAD FOR HAND-HELD PAINT SPRAY GUNS

BACKGROUND OF THE INVENTION

1. Field of the Invention

This invention relates generally to hand-held power tools and more particularly to an improved hand-held paint spray gun which includes a replaceable handle grip pad that is molded into the handle grip.

2. Background of the Related Art

Hand held paint spray guns are used in a variety of jobs in, for example, manufacturing and automotive body repair shops. In addition, residential and commercial painters make use of spray guns. Frequent use of a spray gun over extended periods of time may result in the operator developing fatigue and stress in the hand and wrist. Known spray gun handle design is not directed toward vibration absorption or dampening. Thus, fatigue and stress can be aggravated by the design of the spray gun's handle grip by, for example, not allowing the operator to modify his or her grip and by transferring the vibrational energy from the spray gun to the operator's hand. Ultimately, ergonomic injuries can result. Therefore, a need exists for an improved spray gun handle that can reduce the fatigue and stress on a user.

Certain inventions are directed toward reduction of fatigue and stress experienced by operators of hand held paint spray guns. For example, U.S. Pat. Nos. 5,236,129 and 5,330,108 to Grime et al., disclose the use of replaceable hand grip covers. The hand grip covers may be substantially customized to allow more comfortable fit with the specific operator hand shape and size. However, these handle grip covers require covering the hand grip with a sleeve or cover as well as changing the sleeve or cover when a different operator with substantially smaller or larger hands begins to use the spray gun. Such an operation can be difficult and time consuming and relatively ineffective in dampening vibration transfer to the operator's hand. Therefore, a need exists for a spray gun handle that is designed to reduce operator fatigue, stress and ergonomic injuries by reducing the vibrational transfer to the operator's hand.

SUMMARY OF THE INVENTION

A handle in accordance with the present invention can meet the above needs and provides additional improvements and advantages that will be obvious to those skilled in the art upon review of the present disclosure.

The present invention provides a pad for handle grips of hand held paint spray guns. Frequent prolonged use of paint spray guns can result in the fatiguing and stressing of operator hands. Fatigue and stress can be aggravated by the transfer of vibrational energy to the operator's hand and by requiring the operator to hold his or her hand in essentially one position on the handle grip. A pad in accordance with the present invention can reduce such fatigue and stress. The pad generally fits within a recessed region that is molded into the rear surface of the paint spray gun handle where the operator's palm meets the grip. Alternatively, the pad can be attached to existing paint spray gun handle grips that are lacking the recessed region. The pad is typically made of a material that is less dense than the synthetic resinous material of the spray gun handle grip. Preferably, the material is plastic foam or gel and is attached to the spray gun handle using an acrylic glue or the equivalent. The pad is designed to absorb some of the vibrational energy that is transmitted to the operator's hand in current spray gun handles. This reduction in vibrational energy transmission decreases operator fatigue and stress. The pad is deformable which provides the operator with added comfort by improving the fit between the operator's palm and the spray gun handle grip and allowing the operator to take advantage of the deformability of the pad to allow for a firmer or more relaxed grip, thus reducing fatigue and stress. The material of the pad also allows for a more comfortable and secure grip by the operator on the spray gun handle. The pad is designed to accommodate different hand sizes and shapes without the need to remove and replace hand grip covers or sleeves.

An object and advantage of the present invention is that the foam or gel material used in the replaceable pad may easily deform to accommodate hands of substantially any size or shape, within reason, making it unnecessary to use different sized hand grip sleeves or covers.

Another object and advantage of the present invention is that the foam or gel material may reduce the transmittal of vibrational energy from the spray gun, thus decreasing operator fatigue.

Another object and advantage of the present invention is that the deformability of the foam or gel material may allow the operator to make small positional modifications in his or her grip, thus allowing improved ergonomic positioning which assists in preventing repetitive motion injuries as well as decreasing operator fatigue.

Yet another object and advantage is that the pad may provide for a more secure grip on the handle of the spray gun.

The foregoing objects and advantages of the invention will become apparent to those skilled in the art when the following detailed description of the invention is read in conjunction with the accompanying drawings and claims. Throughout the drawings, like numerals refer to related or identical parts.

DETAILED DESCRIPTION OF THE INVENTION

With reference to the accompanying figures, there is provided an apparatus for reducing the fatigue and stress experienced by operators of hand held paint spray guns.

Figure 1:
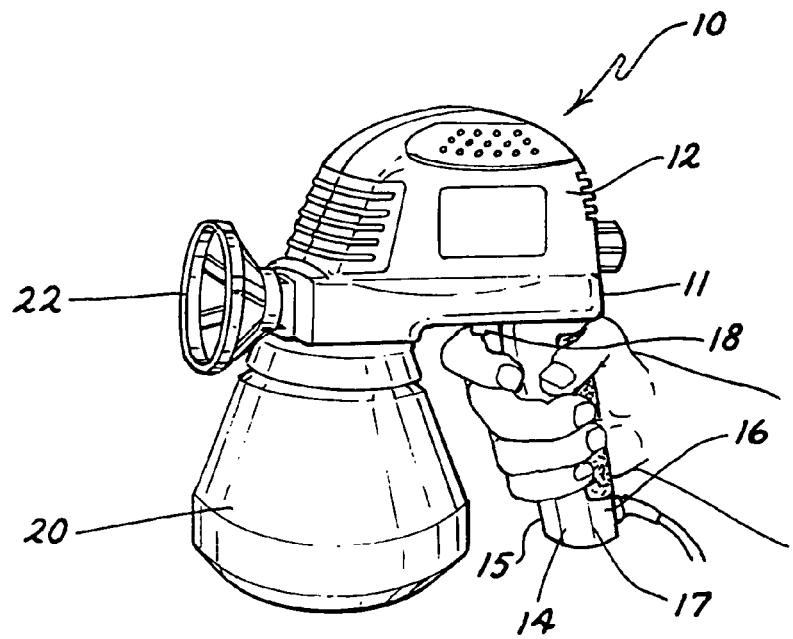
FIG. 1 is a perspective view of an embodiment of a paint spray gun in accordance with the present invention engageably received by an operator's hand.

Referring now to FIG. 1, the spray gun (10) generally includes a body (11) comprising a main housing (12) and a handle grip (14) extending from the housing (12). The handle grip (14) is typically manufactured from a hard synthetic resinous material and includes a front surface (15), a rear surface (16) and side surfaces (17). An actuating trigger (18) can be mounted on the front surface of the handle grip (15). Paint to be sprayed may be retained in the paint reservoir (20) which can be attached to the housing (12). The paint is discharged from the spray gun (10) from a spray assembly (22) which is also mounted on the housing (12).

Figure 2:
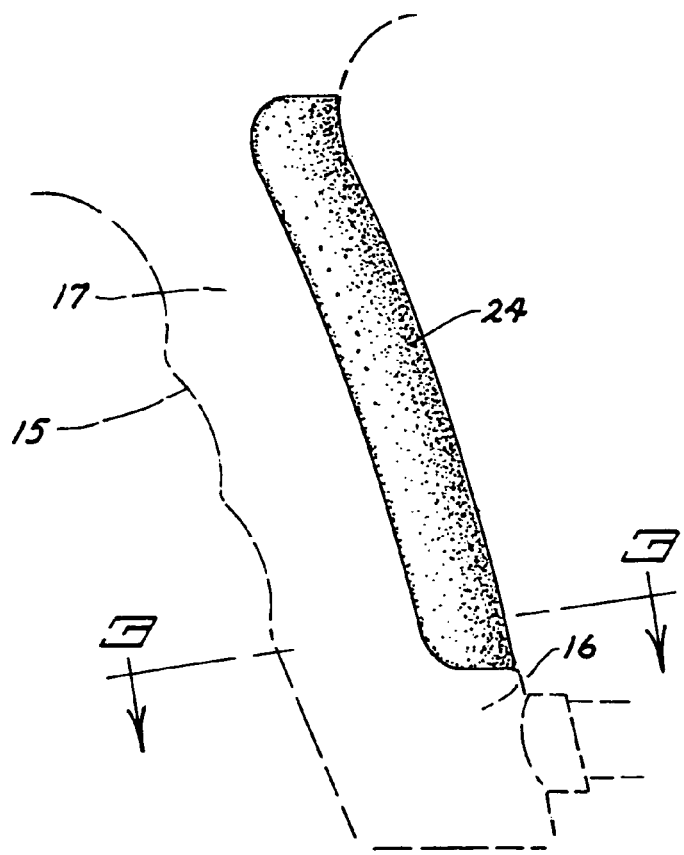
FIG. 2 is cross sectional side view of an embodiment of a paint spray gun handle grip in accordance with the present invention with the vibration dampening pad installed.
Figure 3:
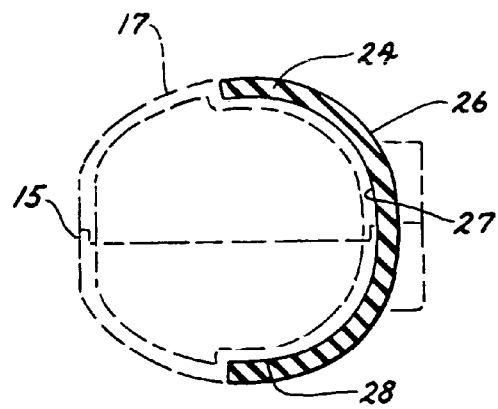
FIG. 3 is a cross sectional view of an embodiment of a paint spray gun handle grip in accordance with the present invention with a single layer vibration dampening pad installed.
Figure 4:
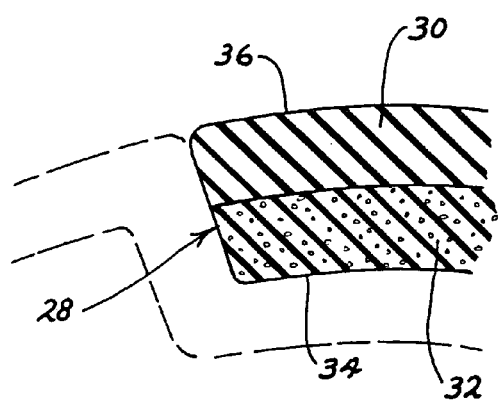
FIG. 4 is a cross sectional view of an embodiment of a paint spray gun handle in accordance with the present invention with a double layer vibration dampening pad installed.

FIGS. 2 and 3 show the handle grip (14) with the vibration dampening pad (24) installed on the rear surface (16). In this exemplary embodiment, the pad is substantially rectangular in shape and the top surface (26) of the pad is in general alignment with the surface of the handle grip (14). To accomplish this alignment, the pad (24) is fitted to a recessed region (28) that is molded into the handle grip as indicated in FIGS. 3 and 4. It will be appreciated to those skilled in the art that a large possibility of shapes for the pad exist. For example, the pad may be circular, oval, or square as long as the pad allows the engagement of the operator's palm while grasping the handle grip (14). Further, the recessed region may be extended to include all or a portion of the side surfaces (17) of the handle grip. In this alternate embodiment, the pad will cover portions of the rear (16) and side (17) surfaces of the handle grip, providing for maximum coverage of the operator's palm when engaging the handle grip (14).

FIG. 3 indicates that in one embodiment of the invention, the pad may be a single layer of material with a top surface (26) and a bottom surface (27). The single layer will preferably be of a material that is less dense than that of the handle grip. Materials such as plastic foam or gel are acceptable.

The use of more than one layer is also disclosed. As seen in FIG. 4, the design may include several layers of material. The materials may differ in densities to provide maximum comfort to the operator. In the preferred embodiment, the top layer (30) is more supple than the bottom layer (32). Thus, the bottom layer can be more firm, or more dense, than the top layer. Furthermore, one or more middle layers may be included to increase comfort. In the preferred embodiment, the firmness or density of the layers will increase from the top layer to the bottom layer. It will be appreciated by those skilled in the art, however, that any number of combinations of materials and densities may be used to accomplish the invention.

Each of the layers are in the preferred embodiment of substantially uniform thickness. The bottom layer (32) has a bottom surface (34) that rests on, and is secured to, the recessed surface of the handle grip (28). The top layer (30) is exposed and has a top surface (36) adapted for engageably receiving the palm of the person operating the paint spray gun. The top and bottom layers are suitably bonded together. If middle layers are employed, they are intermediate and sandwiched between the bottom layer (32) and the top layer (30), the layers being suitably bonded together.

Because paint can be corrosive to some materials, it is preferable that the material used for the single-layer embodiment, or the top layer in the multi-layer embodiment, be selected to be impervious to paint. In addition, the material should allow for easy removal and cleanup of any paint residue following operation. An alternative embodiment of the pad not shown in the figures, provides an outer covering that covers the outer surface of the pad to enhance durability and increase cleaning efficiency. Such a membrane may be constructed of substantially taut and flexible material such as leather or vinyl or any number of equivalent materials. In addition to the aforementioned advantages, the outer covering serves to restrain against longitudinal and lateral displacement of the pad when a transverse force is applied during operation.

The pad (24) is, in the preferred embodiment, permanently secured to the recessed region of the handle grip (28) by use of glue or equivalent bonding methods. In the case of the single layer pad, the bottom surface of the single layer (27) will be secured to the recessed region (28). In the case of more than one layer, the bottom surface of the bottom layer (32) will be secured to the recessed region (28). An alternate embodiment allows for removal and replacement of the pad (24) when necessary. In this embodiment, the pad (24) is removably secured to the recessed region of the handle grip by use of Velcro or the equivalent. A new pad (24) is then simply secured to the recessed region of the handle grip (28).

Figure 5:
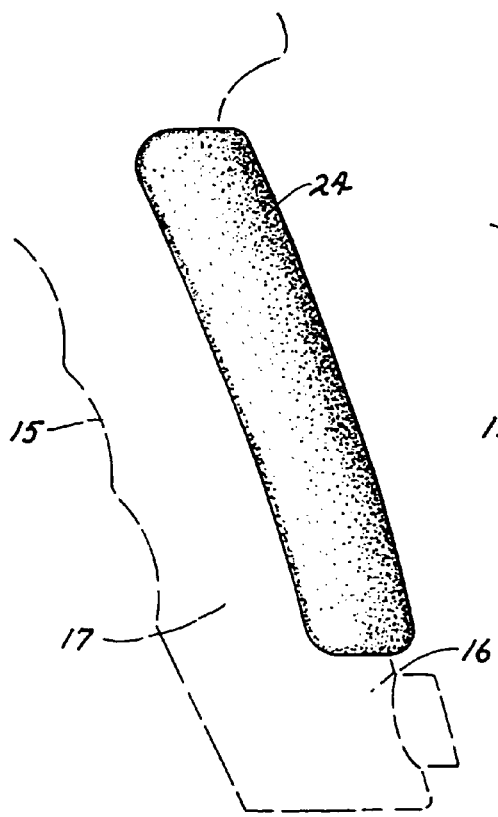
FIG. 5 is a broken away side view of an embodiment of a paint spray gun handle grip in accordance with the present invention showing an alternate embodiment of the vibration dampening pad.

FIG. 5 illustrates an alternate embodiment comprising a pad (24) that is thicker than other embodiments and wherein the top surface is raised relative to the surface of the handle grip. This embodiment may be seen to provide a slightly different grip feel and improve the ergonomic positioning of the operator. In addition, it may be used to accommodate hands that are larger than normal. In this case, the thicker pad (24) works to increase the circumference of the handle grip and allows for the operator to fully and comfortably engage the grip during operation.

Figure 6:
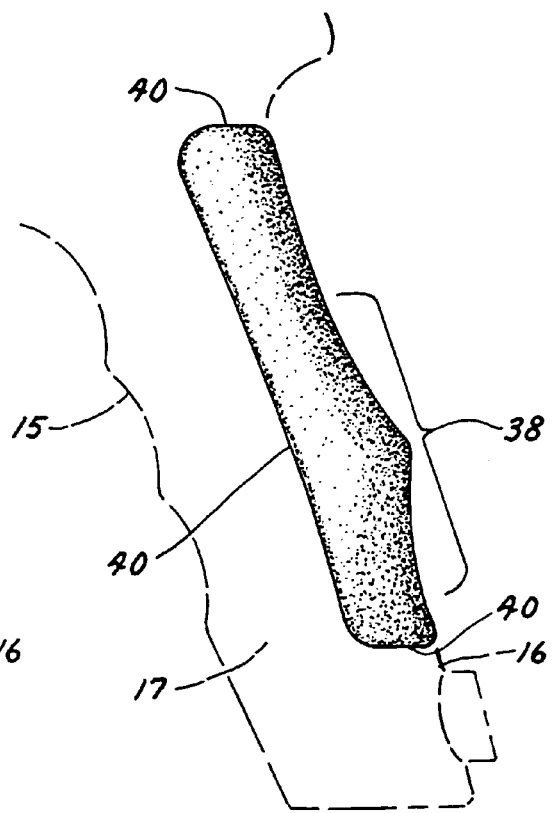
FIG. 6 is a broken away side view of an embodiment of a paint spray gun handle grip in accordance with the present invention showing an alternate embodiment of the vibration dampening pad.

FIG. 6 illustrates another embodiment of the invention involves improving the fit of the pad to the operator's hand by increasing the thickness of the interior of the pad (36) with respect to the edges of the pad (38). The increased thickness and corresponding contour of the pad's interior (36) essentially corresponds to the concave shape of the operator's palm as it engages the handle grip (14) and the pad (24). This configuration promotes comfort and provides added stability during operation. This embodiment may also be a single layer or more than one layer in construction.

The pad reduces fatigue experienced by an operator of paint spray guns fatigue and assists in preventing ergonomic injuries by dampening vibration transmission from the paint spray gun to the operator's hand and by allowing the operator to hold the paint spray gun with a greater degree of comfort.

The above specification describes certain preferred embodiments of this invention. This specification is in no way intended to limit the scope of the claims. Other modifications, alterations, or substitutions may now suggest themselves to those skilled in the art, all of which are within the spirit and scope of the present invention. It is therefore intended that the present invention be limited only by the scope of the attached claims below.

What is claimed is:

1. A hand held paint spray gun comprising:
  a. a body;
  b. a molded handle grip, the handle grip attached to the body, the handle grip further comprising a front surface, side surfaces, a rear surface and a recessed region disposed on the rear surface; and
  c. a pad disposed within the recessed region of the rear surface of the handle grip, wherein the pad is comprised of lesser density material than the handle grip, the pad comprising a top layer, a bottom layer and at least one middle layer, wherein the firmness of each layer increases from the top layer to the bottom layer, the pad further comprising an outer covering, wherein the outer covering is taut, flexible and resistant to paint sprayed by the gun.

2. A hand held paint spray gun comprising:
  a. a body;
  b. a molded handle grip, the handle grip attached to the body, the handle grip further comprising a front surface, side surfaces, a rear surface and a recessed region disposed on the rear surface; and c. a non-conductive pad disposed within the recessed region of the rear surface of the handle grip wherein the pad is comprised of lesser density material than the handle grip.

3. A hand held paint spray gun comprising:

a. a body;

b. a molded handle grip, the handle grip attached to the body, the handle grip further comprising a front surface, side surfaces, a rear surface and a recessed region disposed on the rear surface;

c. a pad having at least a top layer and at least a bottom layer, the bottom layer being more firm than the top layer; the top layer being comprised of material resistant to attack from the paint sprayed by the gun; and d. the pad disposed within the recessed region of the rear surface of the handle grip wherein the pad is comprised of lesser density material than the handle grip.

4. A hand held paint spray gun comprising:

a. a body;

b a molded handle grip, the handle grip attached to the body, the handle grip further comprising a front surface, side surfaces, a rear surface and a recessed region disposed on the rear surface; and c. a pad disposed within the recessed region of the rear surface of the handle grip wherein the pad is comprised of lesser density material than the handle grip, the pad comprising a top layer of material resistant to paint sprayed by the gun, a bottom layer and at least one middle layer, wherein the firmness of each layer increases from the top layer to the bottom layer.

\* \* \* \* \*